United States Patent [19]
Cox

[11] Patent Number: 5,526,759
[45] Date of Patent: Jun. 18, 1996

[54] METHOD AND APPARATUS FOR LAYING CHICK FEED SUPPORT PAPER

[76] Inventor: Robert J. Cox, 692 Baugh Springs Trail, McDonald, Tenn. 37353

[21] Appl. No.: 142,718

[22] Filed: Oct. 25, 1993

[51] Int. Cl.⁶ ........................................ A01G 7/00
[52] U.S. Cl. ................ 111/200; 111/199; 119/51.01; 405/176; 405/180; 47/9
[58] Field of Search ............... 47/9 M, 9, 26, 47/56, 1.01; 111/200, 900, 199; 172/725, 721, 732, 733, 765, 770, 699, 701; 405/38, 176, 180, 270; 119/51.01, 52.1

[56] References Cited

U.S. PATENT DOCUMENTS

| | | | |
|---|---|---|---|
| 268,234 | 11/1882 | Howe et al. | 172/732 X |
| 345,387 | 7/1886 | Langlot | 172/733 X |
| 413,076 | 10/1889 | Mavrin | 172/732 X |
| 419,027 | 1/1890 | Arnold | 172/725 X |
| 653,994 | 7/1900 | Freeman | 172/721 X |
| 1,291,361 | 1/1919 | Babst | 172/733 X |
| 2,869,284 | 1/1959 | Abernathy et al. | 47/9 M |
| 3,121,973 | 2/1964 | Phillips et al. | 47/9 |
| 3,176,635 | 4/1965 | Mabon | 47/9 MX |
| 3,180,290 | 4/1965 | Kappelmann et al. | 47/9 MX |
| 3,184,889 | 5/1965 | Gray et al. | 47/9 |
| 3,315,623 | 4/1967 | Tschudy, Jr. | |
| 3,353,297 | 11/1967 | Gervais | |
| 3,559,599 | 2/1971 | Hoadley | |
| 4,513,530 | 4/1985 | Nyboer | 47/9 |
| 4,666,337 | 5/1987 | Pinto | 405/38 |
| 4,953,482 | 9/1990 | Emily | 111/144 |

FOREIGN PATENT DOCUMENTS

| | | | |
|---|---|---|---|
| 957892 | 11/1974 | Canada | 172/733 |
| 2457055 | 6/1975 | Germany | 47/56 |
| 4118066 | 12/1992 | Germany | 119/51.01 |

*Primary Examiner*—Terry Lee Melius
*Assistant Examiner*—Christopher J. Novosad
*Attorney, Agent, or Firm*—Gerald R. Boss; Cort Flint

[57] ABSTRACT

A method and apparatus for forming a shallow ditch in wood shavings on the floor of a chicken house and laying a web of paper over the ditch while forcibly pushing the central portion of the web into the ditch with the remainder of the paper disposed at the shoulders of the ditch. The apparatus includes a plow depending downwardly from a frame and a beam pivoted to the frame which supports a wheel behind the plow. A roll of paper may be carried by spindles on the frame between the plow and the wheel. The wheel, in operation, is positioned on the upper surface of a web of paper unwound from the roll to permit the roll to unwind while simultaneously pushing the paper into the ditch.

7 Claims, 2 Drawing Sheets

5,526,759

METHOD AND APPARATUS FOR LAYING CHICK FEED SUPPORT PAPER

BACKGROUND OF THE INVENTION

This invention relates to the forming of a shallow ditch and laying paper therein, and more particularly to a method and apparatus for forming a shallow ditch in wood shavings in a chicken feed house and dispensing paper into the ditch so that chicken feed may be dispersed onto the paper for small chicks to eat.

Modern chicken houses have automated feed troughs which are disposed above the floor in the house, the floor being covered with wood shavings. The system is such that feed is automatically dispensed into the troughs as the feed is consumed. The automatic system is only operable when the troughs are above the ground since the chicks could be endangered when the system is operable while on the ground and chicks could be within the troughs. Additionally, since the floors may not be level, if the feed is dispensed while the troughs are at ground level, feed could overflow onto the floor. However, during the first week of a chick's life, it is too small to reach into the trough to feed. Moreover, if all the chicks congregate at the troughs they can crowd each other to the point where some may suffocate. For these reasons chicken farmers dig a shallow ditch in the wood shavings, lay paper in the ditch, and dispense the feed onto the paper. The chicks can then feed off the paper until they become large enough to eat directly out of the trough. At that time the troughs are raised and the system is automated. In the prior art, the ditch is manually dug generally for a portion of the length at both sides of the chicken house and across the house at one end and at a location intermediate the ends. Because these chicken houses can be in the order of 400 to 500 feet long or more, even when the ditch extends half the length of the house, the digging of the ditch and the manual laying of the paper into the ditch can be time consuming, especially considering the fact that most chicken farmers have a number of such feed houses. The feed house is, of course, temporarily decommissioned for feeding the chicks during that time.

SUMMARY OF THE INVENTION

Consequently, it is a primary object of the present invention to provide a method and apparatus for forming a shallow ditch and laying a web of paper therein in an expeditious manner, the central portion of the web being within the ditch and the sides of the paper being at adjacent shoulders or sides of the ditch.

It is another object of the present invention to provide a method and apparatus wherein a shallow ditch is dug in wood shavings or the like in a chicken house and a web of paper is dispensed over the ditch while a central portion is forced into the ditch substantially simultaneously in an efficient cost effective manner.

It is another object of the present invention to provide apparatus which may be pulled by a tractor, the apparatus including a wedge for forming a shallow ditch in wood shavings and the like, and carrying paper roll supporting means and a wheel for permitting a roll of paper to be unwound and for pushing a central portion of the paper into the ditch while the sides of the paper rest on the side borders of the ditch.

Accordingly, the present invention provides a method and apparatus for forming a shallow ditch in the wood shavings and sawdust on the floor of a chicken house and laying a web of paper over the ditch while forcibly pushing the central portion of the web into the ditch with the remainder of the paper disposed at the shoulders or borders of the ditch. Thus, chicken feed may be spread onto the paper for the feeding of very young chicks. The apparatus of the present invention may be mounted behind and pulled by a tractor or the like. the apparatus includes a wedge-shaped plow member depending downwardly from a frame and a beam pivoted to the frame for supporting a wheel rearwardly of the plow. A roll of paper having a width greater than that of the ditch may be carried by spindles mounted on the frame. The wheel, in operation, is disposed on the upper surface of a web of paper unwound from the roll and permits the roll of paper to unwind while simultaneously pushing the paper into the ditch with the lateral sides of the paper resting on the shoulders of the ditch. The plow includes a plate for which a lower portion extends substantially in a vertical plane and has an upper portion inclined to the plane of the lower portion, the plate and lower portion entering into the shavings to dislodge the shavings and the upper portion acting to deflect the shavings dislodged by the lower portion outwardly to form a bulbous shoulder at each lateral border of the ditch.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
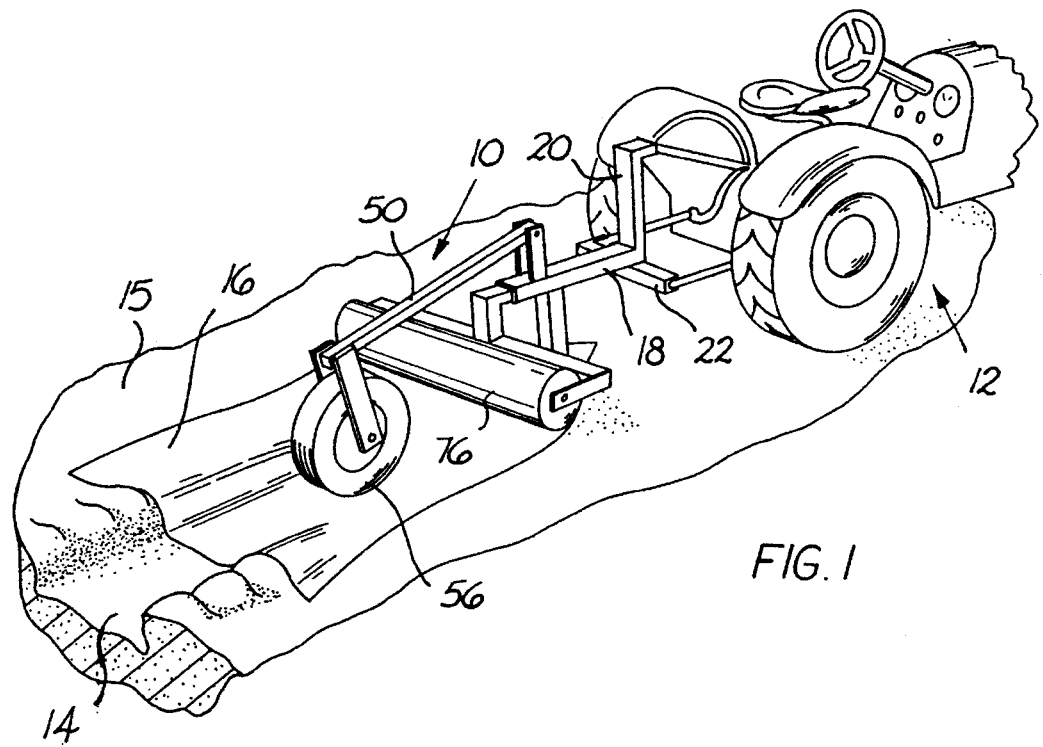
FIG. 1 is a perspective view of the ditch forming and paper laying apparatus of the present invention in operation behind a tractor.
Figure 2:
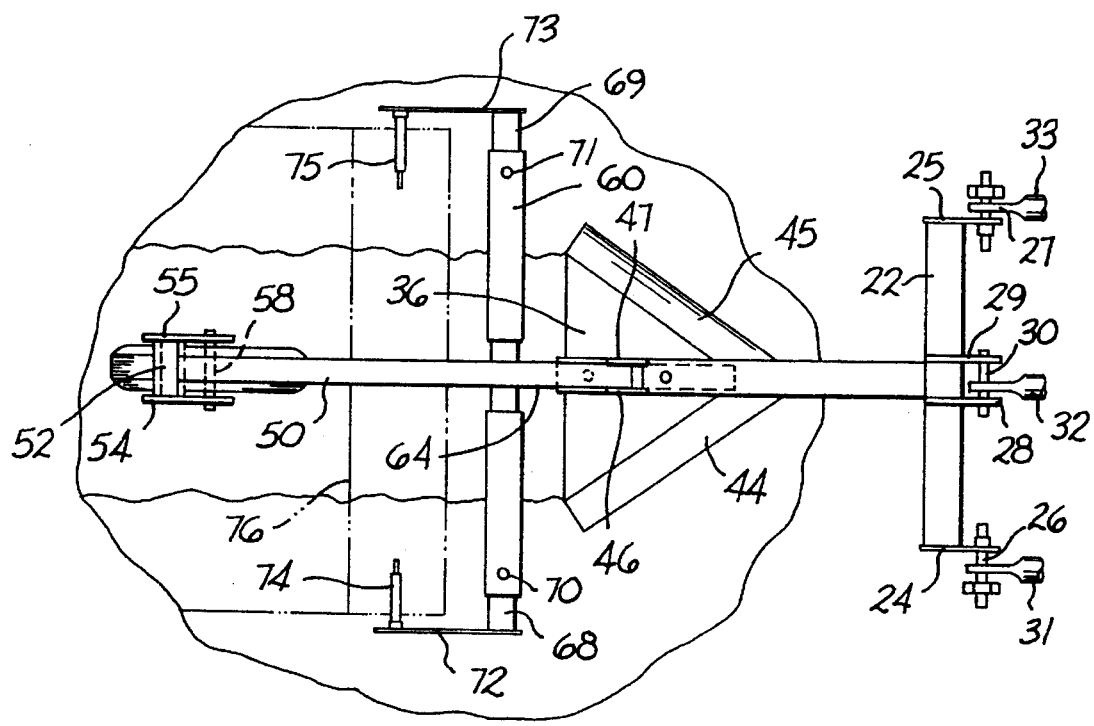
FIG. 2 is a top plan view of the apparatus of FIG. 1.
Figure 3:
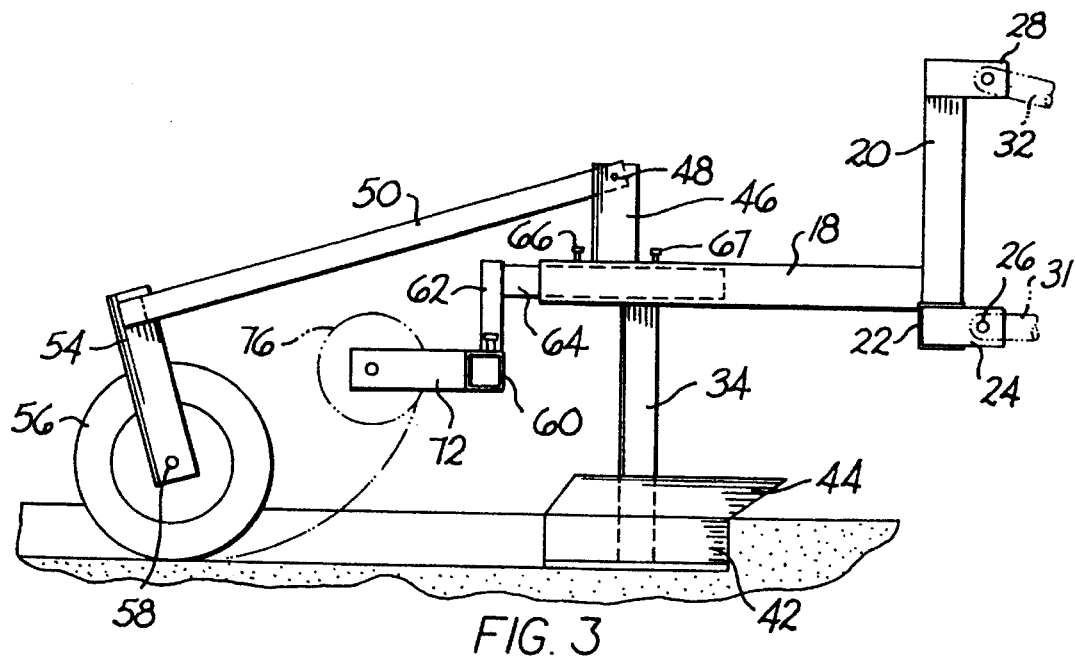
FIG. 3 is a side elevational view of the apparatus of FIG. 1.

Referring to the drawings, FIG. 1 illustrates ditch forming and paper laying apparatus 10 constructed in accordance with the present invention in an operative position being towed by a conventional farm or garden tractor 12 for forming a shallow ditch 14 in wood shavings 15 on the floor while laying a web of paper 16 into the ditch and on the adjacent sides of the ditch. The apparatus 10 includes a frame comprising an elongated beam 18 positioned in a substantially horizontal disposition and having the lower end of an upstanding post 20 and the central portion of a laterally extending rail 22 secured at the forward end. Preferably, the beam, post and rail, which extend in three planes substantially normal to each other, are formed from hollow steel tubing such as square tubing, and the post 20 and rail 22 are welded to the beam 18. A respective flat plate 24, 25 is secured at each end of the rail 22, each plate having a bore (not illustrated) for receiving a respective hitch pin 26, 27. Additionally, a respective plate 28, 29 is welded to the upper end of the post 20, the plates having aligned bores for receiving another hitch pin 30 in spanning fashion. The hitch pins 26, 27, 30 respectively may journally carry respective rods 31, 32, 33 which are fastened to the rear of the tractor 12 so that the apparatus 10 may be towed by the tractor.

Figure 4:
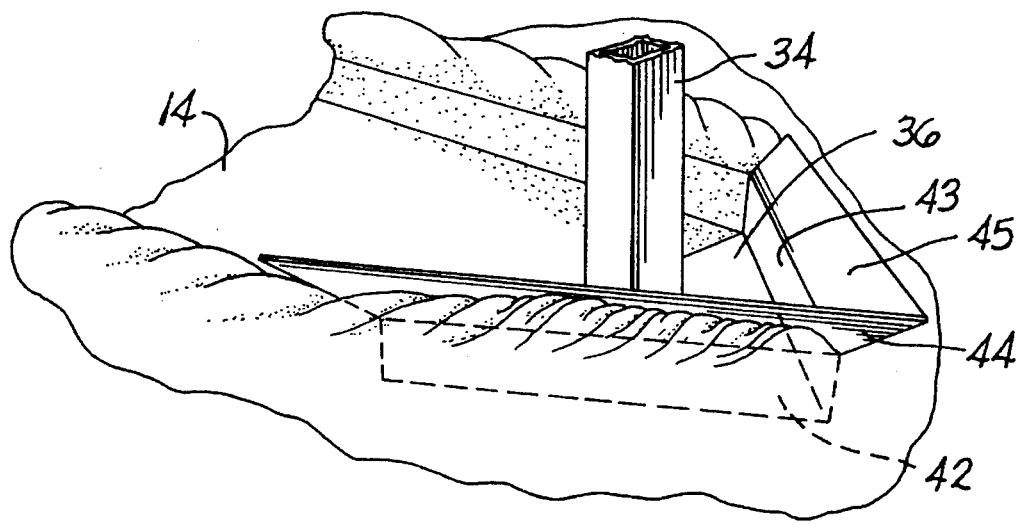
FIG. 4 is a perspective view of the ditch forming wedge or plow portion of the apparatus of FIG. 1 illustrated in an operative position.
Figure 5:
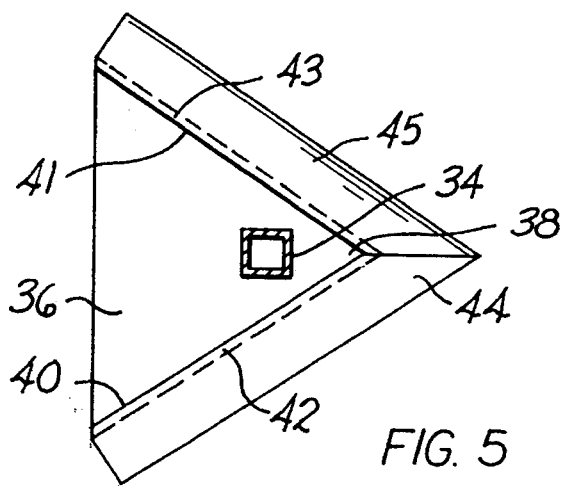
FIG. 5 is a top plan view partly in section of the wedge illustrated in FIG. 4.

Secured to the underside of the beam 18 is the upper end of a downwardly extending post 34 which preferably is also formed from steel tubing which is welded to the beam 18. The lower end of the post 34, which is in the order of 20 inches, is welded to a steel plate 36, best illustrated in FIGS. 4 and 5, having a triangular configuration with one apex 38 extending forwardly beneath the beam 18, the angle of the apex 38 being slightly greater than 60° in a prototype of the apparatus, i.e., the sides 40, 41 of the plate 36 forming the apex being approximately 15 inches and the side opposite the apex being approximately 16 inches. The plate 36 is welded to one leg of a substantially 90° angle beam 42, 43 at each side 40, 41, and the top edge of the other leg of the beam 42, 43 is welded to a respective plate 44, 45 at an angle extending outwardly from the respective beam 42, 43 and the plate 36. The leading edges of the beam 42, 43 are joined together to form substantially the same angle as the apex of the plate 36, while the leading edges of the plates 44, 45 are formed at an incline and joined together to form a point as illustrated. Thus, the plate 36 together with the angle beams 42, 43 and plates 44, 45 form a wedge shaped plow with a point which when pulled through wood shavings or the like form the ditch 14, the angle beams forming the ditch and the plates 44, 45 deflecting the shavings outwardly and rearwardly so as to form a slight bulbous shoulder at each lateral side of the ditch.

Welded to the upper surface of the beam 18 behind the location of the post 34 are a pair of spaced apart upstanding plates 46, 47. Disposed between the plates 46, 47 and pivotally connected thereto by means of a journal pin 48 is one end of an elongated beam 50 which preferably may be formed from square steel tubing. The other end of the beam 50 is welded to a small laterally extending cross member 52 in the form of a tube having its ends welded to downwardly depending respective plates 54, 55 so that the plates 54, 55 are spaced apart laterally. Disposed between the plates 54, 55 is a wheel 56 such as that normally used for wheelbarrows, the wheel being mounted on an axle 58 journalled in the plates 54, 55. The lateral center of the wheel 56 is aligned substantially with the apex 38 of the plate 36 and thus the point of the wedge shaped plow so that the wheel may roll in the ditch 14 along the axis of elongation for reasons which will hereinafter become clear.

Carried by the beam 18 at the rear end thereof is a laterally extending paper support member 60, which may be in the form of a hollow rectangular steel tube, the member 60 being secured as by welding to the lower end of an upstanding channel beam 62. The beam 62 at its upper end is in turn welded to the forward end of a beam 64 which preferably is a square hollow tubular steel member having a smaller cross sectional configuration than the beam 18 so that it may be telescopically received within the rear of the beam 18 and be adjustably positioned relatively thereto. A pair of fasteners in the form of set screws 66, 67 or the like tapped into the beam 64 may adjustably connect the beam 64 to the beam 18. A pair of identical beams 68, 69 having slightly smaller cross sectional configurations to the support member 60 are each telescopically received within a respective end of the beam 60 and secured in position adjustably by set screws 70, 71 or the like. Welded to the outer end of each of the beams 68, 69 is a respective rearwardly extending plate 72, 73, each plate having an inwardly facing pin 74, 75 welded thereto so that the pin 74, 75 are substantially parallel to the beams 68, 69. The pins 74, 75, which act as spindles, are adopted to receive the hollow spool about which a roll 76 of the paper 16 is wound. Since the beams 68, 69 are adjustably mounted, the paper roll may be easily mounted on and carried by the spindles.

In operation, after the apparatus is connected to a tractor at the desired location where the ditch is to be formed, the wheel 56 is lifted to insert the end of the paper 16 beneath the wheel, the pivotal mounting of the beam 50 permitting the wheel to be moved readily. As the tractor pulls the apparatus, the plow forms the ditch and the paper is unrolled from the roll 76 by the action of the wheel 56 acting on the paper web downstream of the roll. The wheel also acts to push the web of paper into the ditch as illustrated in the drawings with the lateral sides of the webs disposed on the shoulders adjacent the borders of the ditch. After the paper has been dispensed, chicken feed may be scattered onto the paper.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method for forming a shallow ditch in particles covering the floor of a chicken house and laying a web of paper in the ditch and on the borders of the ditch so that chicken feed may be scattered on the paper for the feeding of small chicks, said method comprising pulling a wedge shaped plow in a path along the floor to form said shallow ditch in said particles, said ditch having laterally spaced apart shoulders transverse to said path, covering said ditch and borders with paper for providing a feeding platform enabling said chicks to journey over the ditch borders into the ditch for feeding by unrolling paper from a roll moving with said plow having an axis transverse to said path behind said plow while said plow is pulled, said roll of paper having a lateral width greater than that of said ditch, for simultaneously covering both shoulders of said ditch and the ditch itself, said unrolling of paper comprising rolling a wheel within said ditch between said borders longitudinally aligned with the plow on said paper at the same speed as said plow is pulled so that the wheel applies a force to the paper spaced from the axis of the roll to pull and unwind the paper from the roll while the wheel simultaneously pushes the paper into the ditch, while said paper roll maintains lateral portions of the paper outside of the ditch onto the borders.

2. Apparatus adapted to be pulled along the floor of a chicken house for forming a shallow ditch having laterally spaced apart borders in wood shavings on the floor of said chicken house and for laying a web of paper in the ditch and on the borders of the ditch, said apparatus comprising a frame including connecting means for attaching said frame to a pulling device at a forward end of said apparatus, a wedge shaped plow including a point projecting towards said forward end, and a pair of sidewalls extending from said point at an acute angle away from said connecting means, said plow extending downwardly from said frame for receipt into said shavings to displace said shavings and form a shallow ditch having laterally spaced apart shoulders when said plow is moved forwardly through said shavings, a wheel longitudinally aligned with said point of said plow having a width less than the profile of said plow for being disposed within said ditch formed from said plow a wheel support means for journally mounting said wheel at a disposition rearwardly of said plow for rotation about a laterally extending axis of rotation and in a plane substantially aligned with said point, journal means for pivotally mounting said wheel support means on said frame for movement about a pivot axis substantially parallel to said axis of rotation for permitting said wheel to be moved in said plane, paper support means carried by said frame for journally mounting a laterally elongated roll of paper web intermediate said plow and said wheel for rotation about a roll axis substantially parallel to said axis of rotation of said wheel, said paper support means and said paper being of a width larger than the profile of said plow for covering said ditch and said ditch shoulders formed by said plow whereby said wheel may be disposed on a web of paper extending from said roll to unwind paper from said roll and force said paper into said ditch while said paper support means maintains the outer edges of said paper covering said ditch shoulders providing a means for the chicks to traverse said shoulders and proceed into said ditch for obtaining food as said apparatus is pulled through said shavings.

3. Apparatus as recited in claim 2, wherein said plow comprises a substantially planar triangular plate having an apex defined at said point between a pair of adjacent side edges, and upstanding walls fixed to said plate at each of said side edges, said upstanding walls including a lower portion for dislodging said shavings and an upper portion for deflecting dislodged shavings said upper portion extending away from said lower portion and an oblique angle for deflecting said shavings away from said ditch.

4. Apparatus as recited in claim 2, wherein said paper support means includes a pair of laterally telescoping mounted arms having said paper support means further including a pair of spindles extending generally perpendicular from said arms towards said frame for attaching and disattaching said roll or paper to said paper support means, said arms having lateral movement relative to said plow and said wheel.

5. Apparatus adapted to be pulled along the floor of a chicken house for forming a shallow ditch having laterally spaced apart borders in wood shavings on the floor of said chicken house and for laying a web of paper in the ditch and on the borders of the ditch, said apparatus comprising a frame including connecting means for attaching said frame to a pulling device at a forward end of said apparatus, a wedge shaped plow including a point projecting towards said forward end, and a pair of sidewalls extending from said point at an acute angle away from said connecting means, said plow extending downwardly from said frame for receipt into said shavings to displace said shavings and form a shallow ditch having laterally spaced apart shoulders when said plow is moved forwardly through said shavings, a wheel longitudinally aligned with said point having a width less than the profile of said plow for being disposed within said ditch formed from said plow, a wheel support means for journally mounting said wheel at a disposition rearwardly of said plow for rotation about a laterally extending axis of rotation and in a plane substantially aligned with said point, journal means for pivotally mounting said wheel support means on said frame for movement about a pivot axis substantially parallel to said axis of rotation for permitting said wheel to be moved in said plane, said wheel support means including an elongated beam having one end pivotally supported by said journal means and another end carrying a strut means for rotatably carrying said wheel, said pivot axis being disposed above and in front of said axis of rotation, paper support means carried by said frame for journally mounting a laterally elongated roll of paper web intermediate said plow and said wheel for rotation about a roll axis substantially parallel to said axis of rotation of said wheel, said paper support means and said paper being of a width larger than the profile of said plow for covering said ditch and said ditch shoulders formed by said plow whereby said wheel may be disposed on a web of paper extending from said roll to unwind paper from said roll and force said paper into said ditch while said paper support means maintains the outer edges of said paper along said ditch borders providing a means for chicks to traverse said shoulders and proceed into said ditch for obtaining food as said apparatus is pulled through said shavings.

6. Apparatus as recited in claim 5, wherein said plow comprises a substantially planar triangular plate having an apex defined at said point between a pair of adjacent side edges, and upstanding walls fixed to said plate at each of said side edges, said upstanding walls including a lower portion for dislodging said shavings and an upper portion for deflecting dislodged shavings said upper portion extending away from said lower portion at an oblique angle for deflecting said shavings away from said ditch.

7. Apparatus as recited in claim 6, wherein said paper support means includes a pair of laterally telescoping mounted arms having movement relative to said plow and said wheel, said paper support means further including a pair of spindles extending generally perpendicular from said arms towards said frame for attaching and disattaching said roll of paper to said paper support means, said arms having lateral movement relative to said plow and said wheel.

* * * * *